Figure 1:
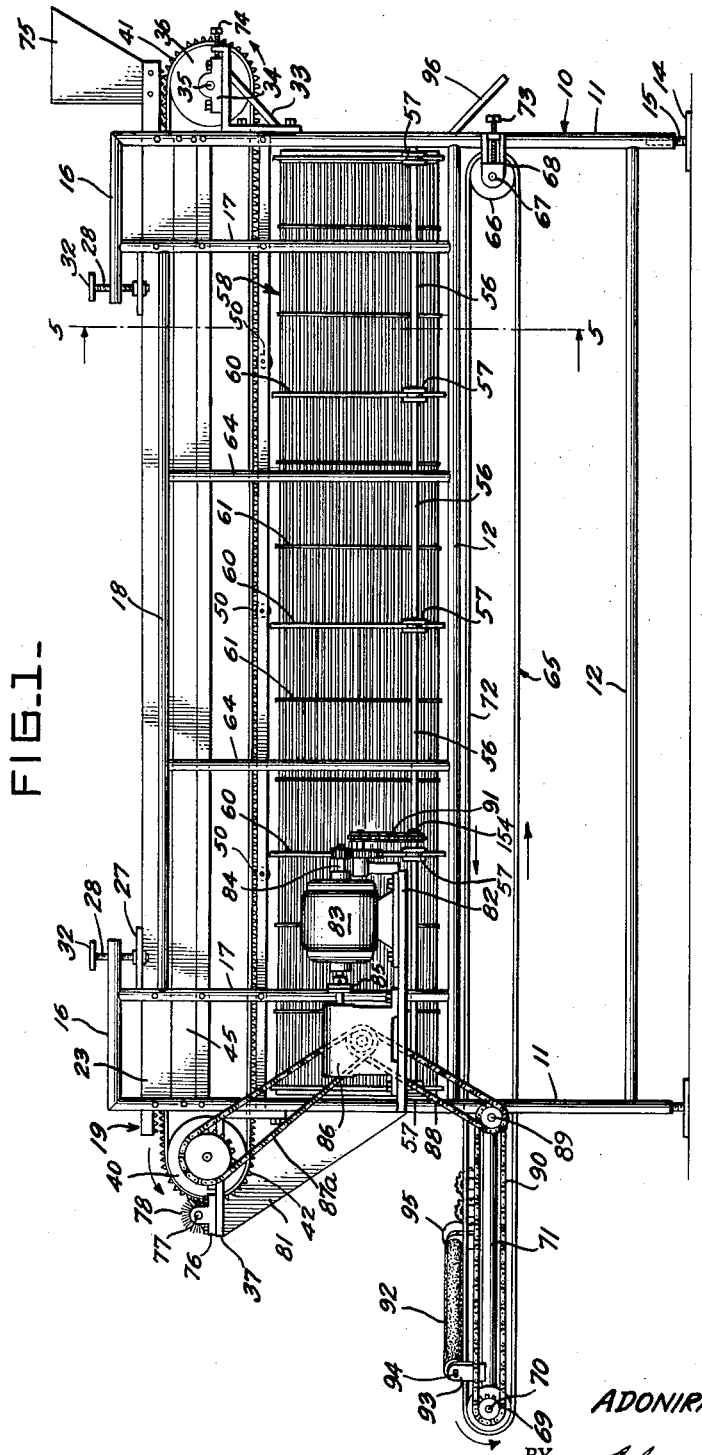

Aug. 4, 1964     A. J. CHURCHILL     3,142,860
APPARATUS FOR TENDERIZING AND SEPARATING MEAT FROM BONES
Filed Jan. 18, 1957     4 Sheets-Sheet 1

INVENTOR
ADONIRAM J. CHURCHILL
BY
ATTORNEY

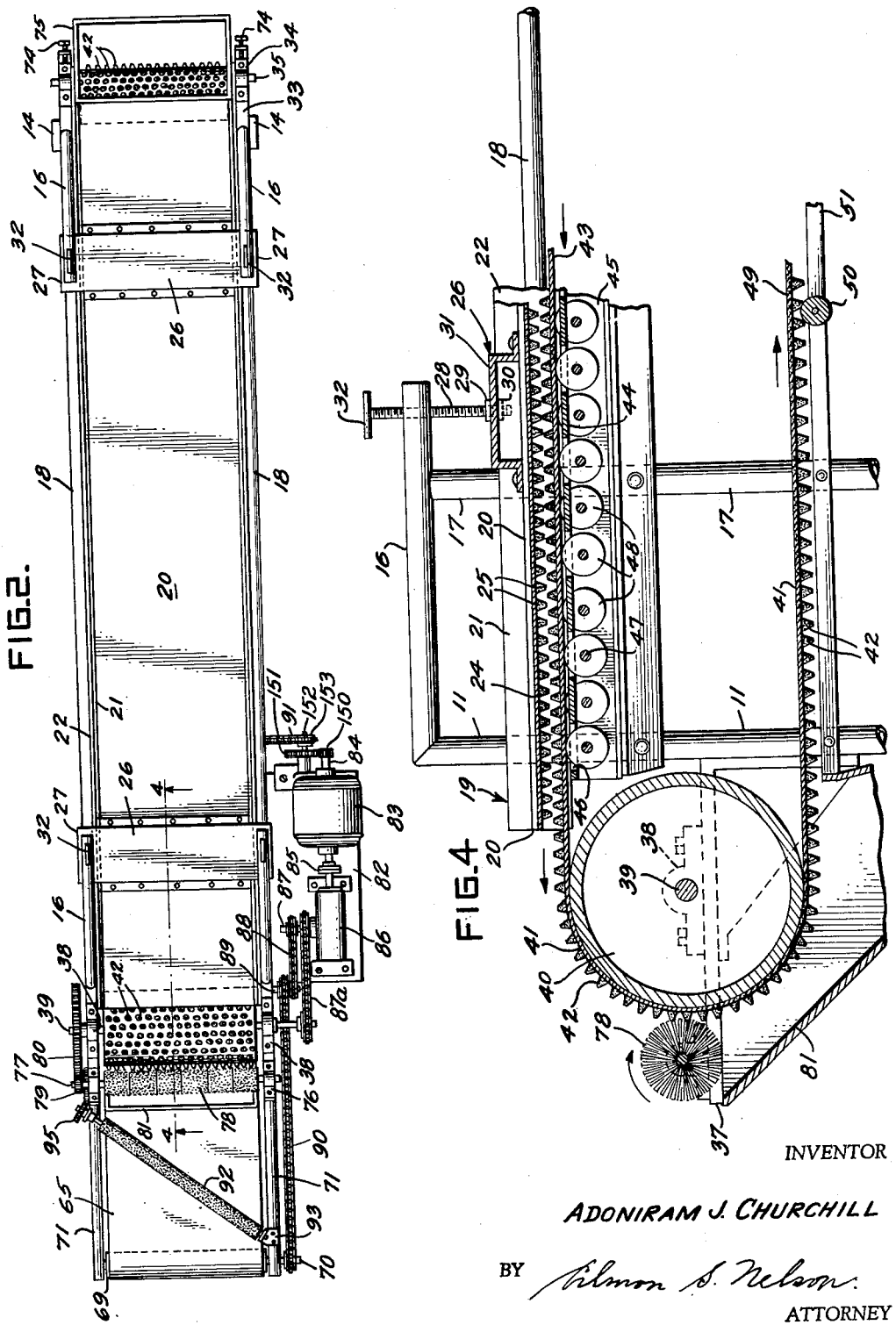

Aug. 4, 1964 A. J. CHURCHILL 3,142,860
APPARATUS FOR TENDERIZING AND SEPARATING MEAT FROM BONES
Filed Jan. 18, 1957 4 Sheets-Sheet 3
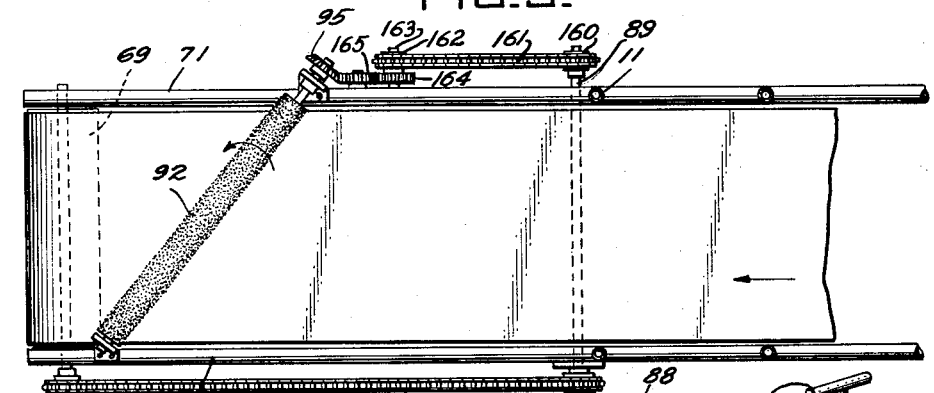
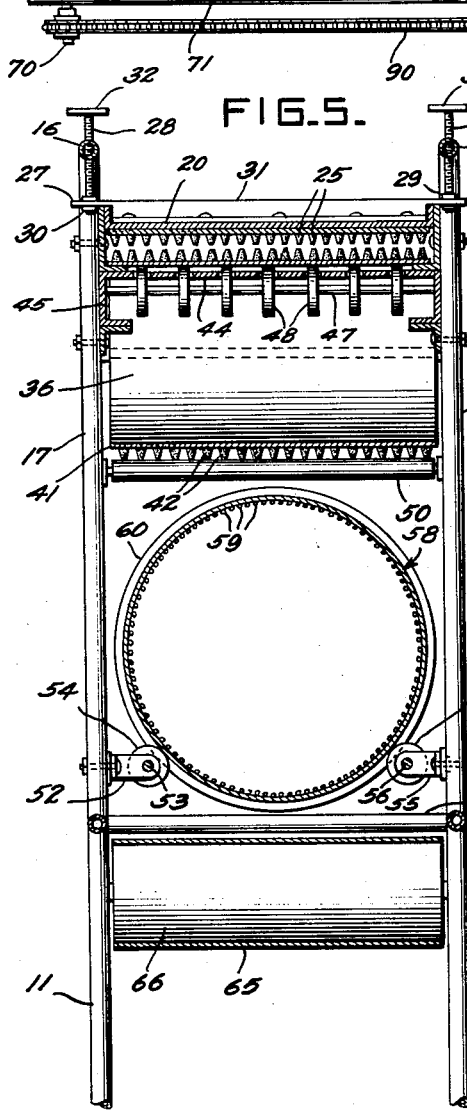
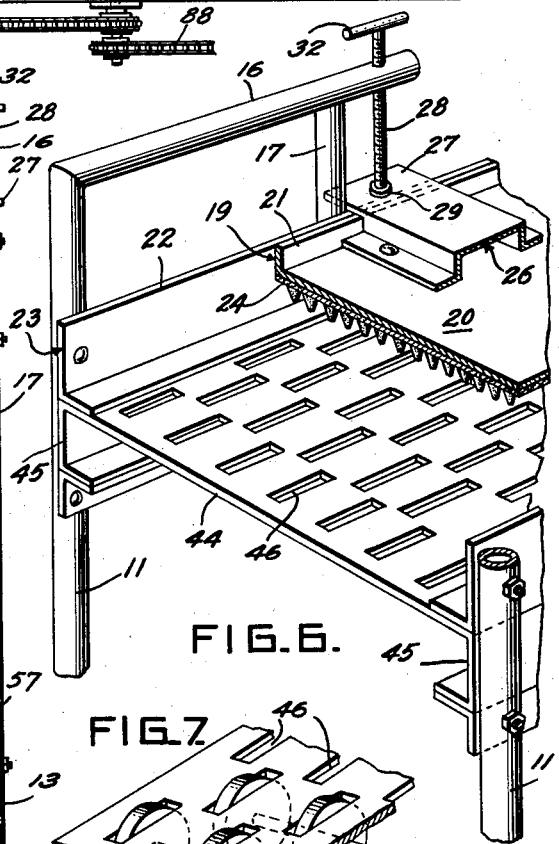
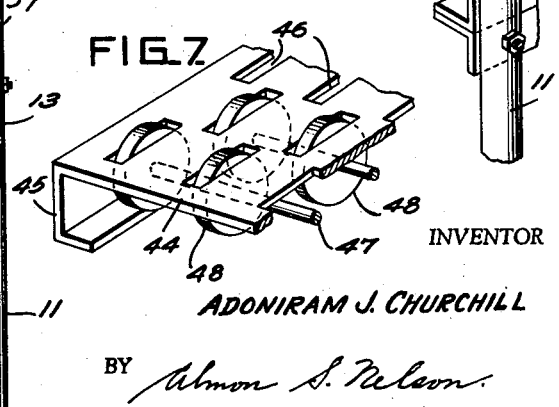
INVENTOR
ADONIRAM J. CHURCHILL
BY Almon S. Nelson
ATTORNEY

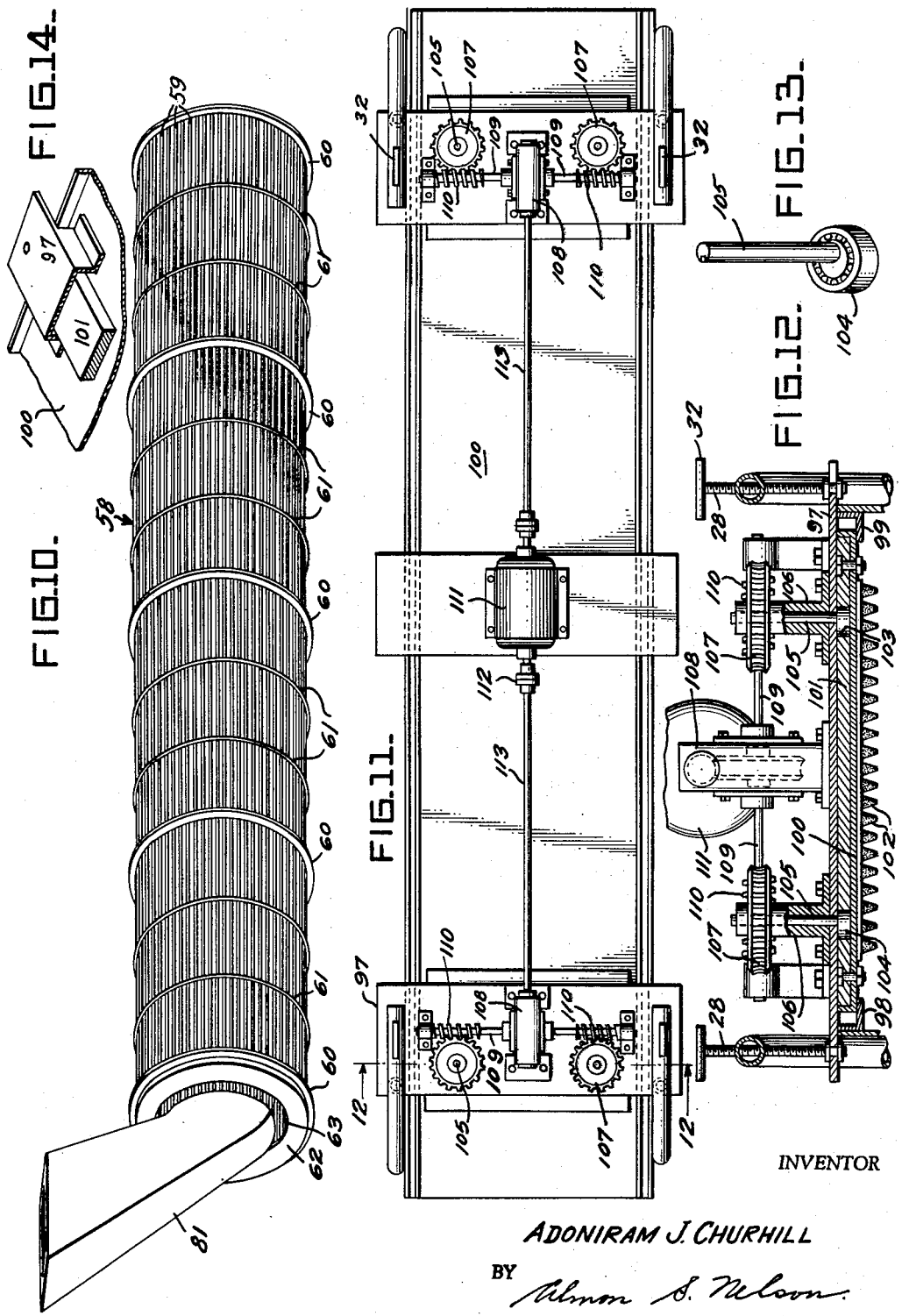

United States Patent Office 3,142,860
Patented Aug. 4, 1964

3,142,860
APPARATUS FOR TENDERIZING AND SEPA-
RATING MEAT FROM BONES
Adoniram J. Churchill, Opa-Locka, Fla., assignor to
Gordon Johnson Company, Kansas City, Mo., a corporation of Missouri
Filed Jan. 18, 1957, Ser. No. 634,967
12 Claims. (Cl. 17—1)

This invention relates to the processing of food products and more particularly to an apparatus for tenderizing and separating meat from bones and specifically the necks of chicken, turkeys or other fowl to separate the meat therefrom and render the same suitable for use in various types of food products.

As is well known, the meat from the necks of chickens, turkeys or other fowl constitutes a less desirable part of such birds with the result that such meat is frequently discarded or wasted, particularly in commercial packing or processing plants, since the cost of treating and handling the same to render such meat suitable for use in food products is frequently prohibitive. Attempts have been made to utilize such meat by first cooking the same and then tumbling the meat in drums, but this has not been particularly successful, since the meat does not become fully separated from the bone and furthermore, the meat remains relatively tough, since there is no kneading or treatment of the fibers or tissues to tenderize the same. As a result, such meat has heretofore not been widely used and as a consequence, a source of income has been lost.

The meat from the necks of chickens, turkeys and other fowl when properly treated is suitable for use in salads, pot pies and the like and in other food products where the meat may be utilized in relatively small particles, but, of course, the meat must be relatively tender and all bone must be separated therefrom. It has been found that by properly cooking the necks of chicken, turkeys and other fowl and thereafter treating the same in an apparatus constructed in accordance with this invention, that such meat is completely separated from the bone and is rendered suitable for use in food products, such as those mentioned above.

It is accordingly an object of the invention to provide an apparatus for treating the necks of chicken, turkeys and other fowl to tenderize and separate the meat from the bones in such a manner as to render the meat suitable for use in food products.

A further object of the invention is the provision of an apparatus for automatically tenderizing and separating meat from bones, which apparatus may be conveniently and economically constructed of readily available material and which may be operated by unskilled labor.

A still further object of the invention is the provision of an apparatus for tenderizing and separating meat from bones which operates to thoroughly knead and shred the meat thereby tenderizing and removing the same from the bones and thereafter sifting the same to completely separate the meat and bones.

Another object of the invention is the provision of an apparatus for treating the necks of chicken, turkeys and other fowl to tenderize and separate the meat from the bones, which apparatus may be conveniently adjusted to accommodate necks of different sizes.

A further object of the invention is the provision of apparatus for tenderizing and separating meat from bones, which apparatus is completely automatic in operation, it only being necessary to supply the products to be treated thereto and to remove the separated and tenderized meat.

A still further object of the invention is the provision of apparatus for treating the necks of chicken, turkeys and other fowl to separate the meat from the bones, which apparatus is provided with yieldable parts which serve to prevent damage in the event that abnormally large pieces of bone are introduced thereto.

Another object of the invention is the provision of an apparatus for tenderizing and separating meat from bones and in which the operation is entirely mechanical thereby permitting use of the apparatus in any desired location without requiring the supply of steam, hot water or other fluids to provide suitable operation.

Figure 9:
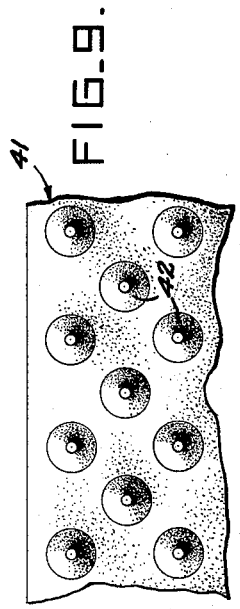
Figure 8:

Further objects and advantages of the invention will be apparent from the following description taken in conjunction with the accompanying drawing wherein:

FIG. 1 is a side elevational view of an apparatus constructed in accordance with this invention;

FIG. 2 a top plan view of the apparatus shown in FIG. 1;

FIG. 3 a top fragmentary plan view to an enlarged scale and showing the delivery end of the apparatus;

FIG. 4 a fragmentary sectional view to an enlarged scale taken substantially on the line 4—4 of FIG. 2;

FIG. 5 an enlarged sectional view taken substantially on the line 5—5 of FIG. 1;

FIG. 6 a fragmentary view in perspective to an enlarged scale and with parts broken away for greater clarity and showing the platen, together with the plate for providing a support for the treating belt;

FIG. 7 a fragmentary perspective view to an enlarged scale and showing the supporting rollers for the treating belt;

FIG. 8 a fragmentary sectional view showing a portion of the treating belt;

FIG. 9 a fragmentary plan view of a portion of the treating belt;

FIG. 10 a view in perspective showing the structure of the sifting drum, together with the chute for supplying meat and bone thereto;

FIG. 11 a top plan view of a modified structure for providing a gyratory motion to the platen;

FIG. 12 an enlarged fragmentary sectional view taken substantially on the line 12—12 of FIG. 11;

FIG. 13 a fragmentary perspective view showing a cam and cam shaft utilized for imparting a gyratory movement to the platen in the form of the invention shown in FIG. 11; and, FIG. 14 a partial perspective view of a detail of one end of the platen 100.

With continued reference to the drawing, there is shown an apparatus constructed in accordance with this invention and which may well comprise a frame 10 which may be conveniently constructed of tubular material and may comprise corner posts 11 longitudinally extending side members 12 and cross members 13. The corner posts 11 may be provided at their lower ends with feet 14 having studs 15 threadedly engaging the corner posts 11, in order to provide a convenient means for leveling the frame 10.

Overhanging brackets 16 may be secured to the corner posts 11 and extend inwardly of the frame and brace members 17 may extend substantially vertically between the brackets 16 and intermediate side member 12 connected between the corner posts 11. A longitudinal brace member 18 may also extend between the vertical braces 17 on each side of the frame 10.

An elongated generally rectangular platen 19 may extend throughout the length of the frame 10 and be received between the corner posts 11 adjacent the upper ends thereof and, as best shown in FIGS. 4, 5 and 6, the platen 19 may well comprise a plate 20 having upwardly extending side flanges 21 which are received for vertical sliding movement between the flanges 22 of angle members 23 secured to the corner posts 11 on each side of the frame 10. The plate 20 of the platen 19 is provided on the lower surface thereof with a facing 24 of yieldable material, such as rubber or other suitable material and depending from the facing 24 are a plurality of yieldable frusto-conical projections 25, the purpose of which will be later described. While the projections 25 are shown as frusto-conical in configuration, of course, any other desired configuration may be employed. The facing 24 may be secured to the lower surface of the plate 20 of the platen 19 in any suitable manner, as by an adhesive or by any other suitable bonding operation, or, if desired, the same may be secured thereto by suitable rivets or other fastening means.

The plate 20 of the platen 19 is provided on the upper surface thereof with cross members 26 of channel formation and such cross members 26 extend transversely of the platen 19 and are provided with outwardly extending portions 27 at opposite ends thereof which are disposed below the overhanging ends of the brackets 16. Rotatably received in the overhanging portions 27 of the cross members 26 are screw threaded adjusting rods 28 which, as shown in FIG. 4, may be conveniently provided with washers 29 and 30 fixed thereto above and below the web 31 of the cross member 26 and the rods 28 are threadedly received in the brackets 16 and are provided with hand engaging cross bars 32 to facilitate rotation thereof to move the platen 19 up or down with relation to the frame 10.

Outwardly extending brackets 33 are mounted on the corner posts 11 at one end of the frame 10 and the brackets 33 serve to support bearing blocks 34 which in turn rotatably receive a shaft 35 carrying a pulley 36 disposed transversely of the frame 10. At the opposite end of the frame 10, an outwardly extending bracket 37 is secured to the corner posts 11 and the bracket 37 serves to support bearing blocks 38 which in turn rotatably receive a shaft 39 carrying a pulley 40 disposed transversely of the frame 10. Trained over the pulleys 36 and 40 is a treating belt 41 and provided on the outer surface of the belt 41, as best shown in FIGS. 8 and 9, are a plurality of frusto-conical yieldable projections 42. While the projections 42 are shown as frusto-conical in configuration, obviously, any other desired configuration may be employed.

The upper flight 43 of the belt 41 is disposed below the platen 19 in spaced substantially parallel relation thereto and in order to support the upper flight 43 of the belt 41 throughout the length of travel thereof beneath the platen 19, there may be provided an elongated generally rectangular plate 44 which, as best shown in FIG. 6, is provided with side flanges 45 secured to the corner posts 11 of the frame 10. The plate 44 is provided with a plurality of transversely extending rows of spaced openings 46 and disposed below each row of openings 46 is a cross shaft 47 rotatably carrying rollers 48 which project upwardly through the openings 46 and, as clearly shown in FIG. 4, engage the inner surface of the upper flight 43 of the belt 41. These rollers 48 serve to support the upper flight 43 of the belt 41 at spaced points throughout the length of travel thereof beneath the platen 19. Other forms of support for the upper flight 43 of the belt 41 may be provided, if desired, but more efficient operation is provided if the belt is supported at spaced points substantially in the manner shown.

The lower flight 49 of the belt 41 may be supported in order to prevent undue sag thereof, by transversely extending spaced rollers 50 rotatably mounted on side bars 51 secured to the corner posts 11 on each side of the frame 10. However, support of the lower flight 49 of the belt 41 is not particularly important, since this portion of the belt performs no treating operations and it is merely necessary to prevent undue sag thereof in order to provide sufficient clearance for mechanism mounted in the frame 10 below the belt, which mechanism will be later described.

Inwardly extending brackets 52 are secured to the corner posts 11 of the frame 10 on one side thereof and brackets 52 serve to rotatably mount a longitudinally extending shaft 53. Fixed on the shafts 53 are longitudinally spaced grooved rollers 54, only one of which is shown in FIG. 5. Similar inwardly extending brackets 55 are secured to the corner posts 11 of the frame 10 on the opposite side and brackets 55 serve to rotatably support a longitudinally extending shaft 56 to which is fixed a plurality of longitudinally spaced grooved rollers 57. The grooved rollers 57 are similar in construction and arrangement to the grooved rollers 54 and are shown in FIG. 1. The grooved rollers 54 and 57 serve to rotatably support a sifting drum 58 which, as best shown in FIG. 10, may comprise a plurality of spaced longitudinally extending bars 59 which are secured in spaced relation by longitudinally spaced annular flanges 60 which extend outwardly of the bars 59. The bars 59 are further supported against distortion by a plurality of longitudinally spaced rings 61 which may be secured to the bars in any suitable manner, as by welding and it is to be noted, that the drum 58 is open at both ends and at one end is provided with an inwardly extending annular flange 62 having a central opening 63 therein. The sifting drum 58 is mounted in the apparatus with the annular flanges 60 engaging the grooves in the rollers 54 and 57 which serve to rotatably mount and drive the same, in a manner to be presently described. It is also to be noted, that the shafts 53 and 56 may be supported intermediate the ends thereof by vertical brace members 64 extending downwardly from the longitudinal frame member 18. The spacing between the bars 59 of the sifter drum 58 is such as to allow particles of a predetermined size to pass therebetween.

Disposed below the sifting drum and extending longitudinally thereof, is an endless conveyor belt 65 and such belt may pass over a drum 66 carried by a shaft 67 rotatably mounted on a bracket 68 secured to the corner post 11 at one end of the apparatus and the opposite end of the conveyor belt 65 may pass over a drum 69 rotatably mounted on a shaft 70 supported on a bracket 71 extending outwardly of the opposite end of the frame 10. The upper flight 72 is disposed just below the sifting drum 58 and serves to receive particles of food products passing between the bars 59 of the sifting drum. The tension in the belt 65 may be controlled by suitable adjusting means 73 associated with the brackets 68 and in a similar manner, the tension of the treating belt 41 may be adjusted by suitable means 74 associated with the brackets 33 and the bearings 34.

A feed hopper 75 may be supported on the platen 19 above and adjacent one end of the treating belt 41 and the necks of chicken, turkeys or other fowl deposited in the hopper 75 will pass downwardly therethrough and be deposited on the upper surface of the upper flight 43 of the treating belt 41.

Also mounted on the brackets 37 on the opposite end of the frame 10 are bearings 76 which serve to rotatably mount a shaft 77 to which is fixed a stripping brush 78 which engages the outer surface of the treating belt 41 as the same passes over the pulley 40. The shaft 77 carrying the stripping brush 78 is provided at one end thereof with a gear 79 which meshes with a gear 80 mounted on the shaft 39 carrying the pulley 40 and it is to be noted, that the gear ratio is such, that the surface speed of the stripping brush 78 is materially greater than the surface speed of the treating belt 41. Secured to the brackets 37 below the stripping brush 78 and the adjacent end of treating belt 41 is a chute 81 which communicates with the opening 63 in the annular flange 62 on the end of the sifting drum 58 with the result that meat and bone removed from the treating belt 41 by the stripping brush 78 will drop into the chute 81 and be delivered to the interior of the sifting drum 58.

A shelf or bracket 82 may be mounted on the frame 10 in any suitable manner and supported on the shelf or bracket 82 is a drive motor 83, the shaft 84 of which may be connected by a suitable coupling 85 to the input side of a reduction gear 86. The output shaft 87 of the reduction gear 86 may be provided with a sprocket engaging a chain 87a which in turn engages a sprocket mounted on the shaft 39 carrying the pulley 40, which upon operation of the motor 83, will serve to drive the treating belt 41. In a similar manner, a sprocket mounted on the output shaft 87 of the reduction gear 86 may engage a chain 88 which in turn engages a sprocket mounted on a countershaft 89 rotatably mounted on the frame 10, which in turn carries a sprocket engaging a chain 90 which is trained over a sprocket mounted on the shaft 70 carrying the drum 69 which engages one end of the conveyor belt 65. Consequently, upon operation of the motor 83, the conveyor belt 65 will also be driven. The power shaft 84 of the motor 83 may extend from the motor on the opposite side from the coupling 85 and this shaft extension may be provided with a pinion 150 that engages a larger gear 151 that is fixed on a stub shaft 152 which also has a sprocket 153 mounted thereon around which chain 91 is trained. Chain 91 is also trained over a sprocket 154 mounted on the shaft 56 carrying the rollers 57 which engage the annular flanges 60 on the sifting drum 58. Accordingly, operation of the motor 83 will also serve to rotate the sifting drum. The particular drive means for the treating belt 41, the conveyor belt 65 and the sifting drum 58 is shown by way of illustration only and obviously, other driving means of any desired nature may be employed.

As stated above, a portion of the conveyor belt 65 extends outwardly of the frame 10 and a cleaning and deflecting brush 92 is rotatably mounted in brackets 93 secured to the extension 71 of the frame 10 and it is to be noted, that the brush 92 is disposed at an angle to the direction of travel of the conveyor belt 65. The shaft 94 carrying the brush 92 may be driven by suitable bevel gearing 95 fixed thereto. For example, the shaft 89 may have a sprocket 160 attached thereto over which a chain 161 is trained, this chain also engaging a sprocket 162 on stub shaft 163. Also mounted on stub shaft 163 is a gear 164 meshing with gear 165 which in turn meshes with the bevelled gear 95 to thereby drive the brush 92.

Mounted on the frame 10 below the end of the sifting drum 58 opposite the chute 81 is a downwardly directed chute 96, the purpose of which will be presently described.

In operation and assuming the motor 83 to be operating, a supply of necks of chicken, turkey or other fowl or other meat and bones is fed to the feed hopper 75 and such necks are deposited on the upper surface of the upper flight 43 of the treating belt 41. The necks are carried between the projections 42 on the treating belt 41 and the projections 25 on the platen 19 and as will be evident, such necks are subjected to a thorough kneading operation which is further accentuated by the fact that the upper flight 43 of the treating belt 41 is supported at spaced points by the rollers 48 which will provide a wavy surface to the belt 41 with the result that the meat is tenderized and shredded and is also separated from the bones. Upon reaching the discharge end of the platen 19, the meat and bones are stripped from the belt 41 by the rotating stripping brush 78 and both meat and bone particles are deposited in the chute 81 which in turn delivers these particles to the interior of the sifting drum 58. Since this drum is rotating, the meat particles will be sifted and pass through the spaces between the bars 59 and the bone will move longitudinally of the drum 58 and will be eventually discharged through the end thereof and down the chute 96 into any convenient receptacle or other means for disposing of the same. Meanwhile, the meat particles passing between the bars 59 of the sifting drum 58 will be deposited on the upper flight 72 of the conveyor belt 65 and such particles will be carried outwardly of the frame 10 and into contact with the deflecting and cleaning brush 92 which will serve to deflect the particles toward one side of the belt 65 where the same may be deposited in a suitable container. Also, if desired, operators may stand at either side of the portion of the belt 65 projecting outwardly of the frame 10 and manually remove any bone fragments or other undesirable material which may be present with the meat particles and also these operators may, if desirable, pack the meat particles in suitable containers. The brush 92 in addition to urging the particles toward one side of the belt 65 will also serve to clean the surface of the belt and maintain the same in a sanitary condition.

The operation of the apparatus, as above described, is continuous and, of course, if further treatment of the meat delivered by the conveyor belt 65 is necessary, the same may be again deposited in the hopper 75 and subjected to the complete operation. However, normally, one pass through the machine is all that is necessary and this will serve to adequately tenderize the meat and separate the same from the bones in order to provide a product suitable for use, as described above.

A somewhat modified form of the apparatus is shown in FIGS. 11 to 14, but this modification relates only to the platen portion of the apparatus. As shown in these figures, cross plates 97 may be mounted for vertical movement on the vertical brace members 17 of the frame 10 and it is to be understood, that the cross plates 97 may be adjusted vertically by any suitable means, such as the screw threaded rods 28 described in connection with the first form of the invention. The cross plates 97 may be provided with depending slides 98 and 99 mounted on opposite sides thereof and these slides serve to support a platen 100 for longitudinal and transverse movement with relation to the cross plates 97. The platen 100 may be provided with a facing on the lower surface thereof and depending from the facing there may be a plurality of frusto-conical yieldable projections 102, similar in nature to the projections described in connection with the first form of the invention.

The platen 100 has two cross bars 101 attached thereto, and these may be provided with a plurality of recesses 103 and in each of these recesses there may be disposed a cam 104 provided with a vertically extending cam shaft 105. The cam shafts 105 extend upwardly through bearings 106 secured to the cross plates 97 and fixed to the upper ends of the cam shafts 105 are worm wheels 107.

Mounted on each cross plate 97 is a reduction gear 108 and extending from opposite sides of such reduction gear is a power output shaft 109 on which is mounted worm gears 110 meshing with the worm wheels 107 fixed to the cam shafts 105.

A drive motor 111 may be mounted in any suitable manner between the cross plates 97 and the power output shaft of the motor 111 may be connected through suitable couplings 112 with drive shafts 113 which in turn are connected to the power input shafts of the reduction gears 108 on each cross plate 97.

It will thus be seen that upon operation of the motor 111, that all of the cams 104 will be simultaneously operated which in turn will impart a gyratory motion to the platen 100 which will provide a further kneading or mechanical working of the necks or other meat and bone products passing between the belt 41 and the platen 100. While this form of the invention is more complex and costly than that above described, nevertheless, an improved operation is obtained and in this instance, it has been found that it is unnecessary to treat the meat products more than once in order to obtain meat which is satisfactory for the uses intended.

It will be seen that by the above described invention, there has been provided a relatively simple, yet highly efficient apparatus for mechanically treating the necks of chicken, turkeys or other fowl to tenderize and separate the meat from the bones and to render the same suitable for use in certain types of food products. The operation of the apparatus merely requires a supply of meat and bones to the same and the removal of the treated meat at the completed operation and consequently, the need for skilled labor is eliminated thereby materially reducing the cost of food product treatment.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. Apparatus for tenderizing and separating meat from bones, said apparatus comprising a frame, an elongated platen carried by said frame, the lower surface of said platen having a facing of yieldable material with a plurality of depending frusto-conical yieldable projections, a pulley rotatably mounted on said frame adjacent each end of said platen, a belt trained over said pulleys with the upper flight disposed in spaced substantially parallel relation below said platen, a plurality of yieldable frusto-conical projections on the outer surface of said belt, means for adjusting the spacing between said platen and the upper flight of said belt, means for supporting the upper flight of said belt at a plurality of spaced points throughout substantially the length of said platen comprising a plate secured to said frame below said upper flight, a plurality of rows of spaced openings in said plate, rollers projecting through said openings and engaging the inner surface of said upper flight, means for driving said belt, whereby meat-carrying bones passing between said platen and said belt will be kneaded by said projections to tenderize, shred, and remove meat from the bones, an elongated sifting drum open at both ends and rotatably mounted in said frame longitudinally thereof below said belt, said drum comprising spaced longitudinally extending parallel bars and spaced reinforcing rings surrounding said drum and secured to said bars, means to drive said drum, a feed hopper above said belt adjacent one end, stripping means comprising a brush rotatably mounted on said frame and engaging the outer surface of said belt where the same passes over said pulley at the end opposite said hopper and means to drive said brush at a surface speed greater than that of said belt, said stripping means serving to strip meat and bones from the projections on said belt, a chute below said stripping means and the adjacent end of said belt for receiving meat and bones and discharging the same into one end of said drum, a conveyor belt disposed below said drum and extending outwardly of said frame for receiving meat passing between the bars of said drum, the bones being discharged from said drum at the end opposite said chute, means to drive said conveyor belt, a rotary brush extending transversely of said conveyor belt and inclined with respect to the direction of travel to clean the surface of said conveyor belt and direct the meat carried thereby toward one side and means to drive said rotary brush.

2. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for adjusting the spacing between said platen and the upper flight of said belt, means for supporting the upper flight of said belt at a plurality of spaced points throughout substantially the length of said platen comprising a plate secured to said frame below said upper flight, a plurality of rows of spaced openings in said plate, rollers projecting through said openings and engaging the inner surface of said upper flight, means for driving said belt, whereby meat-carrying bones passing between said platen and said belt will be kneaded by said projections to tenderize, shred, and remove meat from the bones, an elongated sifting drum open at both ends and rotatably mounted in said frame longitudinally thereof below said belt, said drum comprising spaced longitudinally extending parallel bars, means to drive said drum, a feed hopper above said belt adjacent one end, stripping means comprising a brush rotatably mounted on said frame and engaging the outer surface of said belt where the same passes over said pulley at the end opposite said hopper and means to drive said brush at a surface speed greater than that of said belt, said stripping means serving to strip meat and bones from the projections on said belt, a chute below said stripping means and the adjacent end of said belt for receiving meat and bones and discharging the same into one end of said drum, a conveyor belt disposed below said drum and extending outwardly of said frame for receiving meat passing between the bars of said drum, the bones being discharged from said drum at the end opposite said chute, means to drive said conveyor belt, a rotary brush extending transversely of said conveyor belt and inclined with respect to the direction of travel to clean the surface of said conveyor belt and direct the meat carried thereby toward one side and means to drive said rotary brush.

3. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for adjusting the spacing between said platen and the upper flight of said belt, means for supporting the upper flight of said belt at a plurality of spaced points throughout substantially the length of said platen comprising a plate secured to said frame below said upper flight, a plurality of rows of spaced openings in said plate, rollers projecting through said openings and engaging the inner surface of said upper flight, means for driving said belt, whereby meat-carrying bones passing between said platen and said belt will be kneaded by said projections to tenderize, shred, and remove meat from the bones, an elongated sifting drum open at both ends and rotatably mounted in said frame longitudinally thereof below said belt, said drum having spaced openings therein, means to drive said drum, a feed hopper above said belt adjacent one end, stripping means comprising a brush rotatably mounted on said frame and engaging the outer surface of said belt where the same passes over said pulley at the end opposite said hopper and means to drive said brush, said stripping means serving to strip meat and bones from the projections on said belt, a chute below said stripping means and the adjacent end of said belt for receiving meat and bones and discharging the same into one end of said drum, a conveyor belt disposed below said drum and extending outwardly of said frame for receiving meat passing through the openings in said drum, the bones being discharged from said drum at the end opposite said chute, means to drive said conveyor belt, a rotary brush extending transversely of said conveyor belt and inclined with respect to the direction of travel to clean the surface of said conveyor belt and direct the meat carried thereby toward one side and means to drive said rotary brush.

4. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for supporting the upper flight of said belt at a plurality of spaced points throughout substantially the entire length of said platen comprising a plurality of rows of spaced rollers engaging the inner surface of said upper flight, means for driving said belt, whereby meat-carrying bones passing between said platen and said belt will be kneaded by said projections to tenderize, shred, and remove meat from the bones, an elongated sifting drum open at both ends and rotatably mounted in said frame longitudinally thereof below said belt, said drum having spaced openings therein, means to drive said drum, a feed hopper above said belt adjacent one end, stripping means comprising a brush rotatably mounted on said frame and engaging the outer surface of said belt where the same passes over said pulley at the end opposite said hopper and means to drive said brush, said stripping means serving to strip meat and bones from the projections on said belt, a chute below said stripping means and the adjacent end of said belt for receiving meat and bones and discharging the same into one end of said drum, a conveyor belt disposed below said drum and extending outwardly of said frame for receiving meat passing through the openings in said drum, the bones being discharged from said drum at the end opposite said chute, means to drive said conveyor belt, a rotary brush extending transversely of said conveyor belt and inclined with respect to the direction of travel to clean the surface of said conveyor belt and direct the meat carried thereby toward one side and means to drive said rotary brush.

5. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for supporting the upper flight of said belt at a plurality of spaced points, means for driving said belt, whereby meat-carrying bones passing between said platen and said belt will be kneaded by said projections to tenderize, shred, and remove meat from the bones, an elongated sifting drum open at both ends and rotatably mounted in said frame longitudinally thereof below said belt, said drum having spaced openings therein, means to drive said drum, a feed hopper above said belt adjacent one end, stripping means comprising a brush rotatably mounted on said frame and engaging the outer surface of said belt where the same passes over said pulley at the end opposite said hopper and means to drive said brush, said stripping means serving to strip meat and bones from the projections on said belt, a chute below said stripping means and the adjacent end of said belt for receiving meat and bones and discharging the same into one end of said drum, a conveyor belt disposed below said drum and extending outwardly of said frame for receiving meat passing through the openings in said drum, the bones being discharged from said drum at the end opposite said chute, means to drive said conveyor belt and means to clean the surface of said conveyor belt and direct the meat carried thereby toward one side.

6. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for supporting the upper flight of said belt, means for driving said belt, whereby meat-carrying bones passing between said platen and said belt will be kneaded by said projections to tenderize, shred, and remove meat from the bones, structure for separating meat from the bones, stripping means comprising a brush rotatably mounted on said frame and engaging the outer surface of said belt and means to drive said brush, said stripping means serving to strip meat and bones from the projections on said belt, said structure being disposed for receiving meat and bones from said stripping means, a conveyor belt disposed below said structure and extending outwardly of said frame for receiving meat from said structure, means to drive said conveyor belt, a rotary brush extending transversely of said conveyor belt and inclined with respect to the direction of travel to clean the surface of said conveyor belt and direct the meat carried thereby toward one side and means to drive said rotary brush.

7. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for adjusting the spacing between said platen and the upper flight of said belt, means for driving said belt, whereby meat-carrying bones passing between said platen and said belt will be kneaded by said projections to tenderize, shred, and remove meat from the bones, structure for separating meat from the bones, stripping means comprising a brush rotatably mounted on said frame and engaging the outer surface of said belt and means to drive said brush, said stripping means serving to strip meat and bones from the projections on said belt, a chute below said stripping means for receiving meat and bones and discharging the same to said structure, a conveyor belt disposed below said structure and extending outwardly of said frame for receiving meat from said structure, means to drive said conveyor belt, a rotary brush extending transversely of said conveyor belt and inclined with respect to the direction of travel to clean the surface of said conveyor belt and direct the meat carried thereby toward one side and means to drive said rotary brush.

8. Apparatus for tenderizing and separating meat from bones, said apparatus comprising a frame, an elongated platen carried by said frame, the lower surface of said platen having a facing of yieldable material with a plurality of depending yieldable projections, a pulley rotatably mounted on said frame adjacent each end of said platen, a belt trained over said pulleys with the upper flight disposed in spaced substantially parallel relation below said platen, a plurality of yieldable projections on the outer surface of said belt, means for adjusting the spacing between said platen and the upper flight of said belt, means for supporting the upper flight of said belt, means for driving said belt, whereby meat-carrying bones passing between said platen and said belt will be kneaded by said projections to tenderize, shred, and remove meat from the bones, structure for separating meat from the bones, a feed hopper above said belt adjacent one end, stripping means comprising a brush rotatably mounted on said frame and engaging the outer surface of said belt where the same passes over said pulley at the end opposite said hopper and means to drive said brush at a surface speed greater than that of said belt, said stripping means serving to strip meat and bones from the projections on said belt, a chute below said stripping means and the adjacent end of said belt for receiving meat and bones and discharging the same to said structure, a conveyor belt disposed below said structure and extending outwardly of said frame for receiving meat from said structure, means to drive said conveyor belt, a rotary brush extending transversely of said conveyor belt and inclined with respect to the direction of travel to clean the surface of said conveyor belt and direct the meat carried thereby toward one side and means to drive said rotary brush.

9. Apparatus for tenderizing and separating meat from bones, said apparatus comprising a frame, an elongated platen carried by said frame, the lower surface of said platen having a facing of yieldable material with a plurality of depending frusto-conical yieldable projections, a pulley rotatably mounted on said frame adjacent each end of said platen, a belt trained over said pulleys with the upper flight disposed in spaced substantially parallel relation below said platen, a plurality of yieldable frusto-conical projections on the outer surface of said belt, means for adjusting the spacing between said platen and the upper flight of said belt, means for supporting the upper flight of said belt at a plurality of spaced points throughout substantially the length of said platen comprising a plate secured to said frame below said upper flight, a plurality of rows of spaced openings in said plate, rollers projecting through said openings and engaging the inner surface of said upper flight, means for driving said belt, whereby meat-carrying bones passing between said platen and said belt will be kneaded by said projections to tenderize, shred, and remove meat from the bones, structure for separating the meat from the bones, a feed hopper above said belt adjacent one end, stripping means comprising a brush rotatably mounted on said frame and engaging the outer surface of said belt where the same passes over said pulley at the end opposite said hopper and means to drive said brush at a surface speed greater than that of said belt, said stripping means serving to strip meat and bones from the projections on said belt, a chute below said stripping means and the adjacent end of said belt for receiving meat and bones and discharging the same to said structure, a conveyor belt disposed below said structure and extending outwardly of said frame for receiving meat from said structure, means to drive said conveyor belt, a rotary brush extending transversely of said conveyor belt and inclined with respect to the direction of travel to clean the surface of said conveyor belt and direct the meat carried thereby toward one side and means to drive said rotary brush.

10. Apparatus for tenderizing and separating meat from bones, said apparatus comprising a frame, an elongated platen carried by said frame, the lower surface of said platen having a facing of yieldable material with a plurality of depending frusto-conical yieldable projections, a pulley rotatably mounted on said frame adjacent each end of said platen, a belt trained over said pulleys with the upper flight disposed in spaced substantially parallel relation below said platen, a plurality of yieldable frusto-conical projections on the outer surface of said belt, means for adjusting the spacing between said platen and the upper flight of said belt, means for supporting the upper flight of said belt at a plurality of spaced points throughout substantially the length of said platen comprising a plate secured to said frame below said upper flight, a plurality of rows of spaced openings in said plate, rollers projecting through said openings and engaging the inner surface of said upper flight, means for driving said belt, whereby meat-carrying bones passing between said platen and said belt will be kneaded by said projections to tenderize, shred, and remove meat from the bones, a feed hopper above said belt adjacent one end, stripping means comprising a brush rotatably mounted on said frame and engaging the outer surface of said belt where the same passes over said pulley at the end opposite said hopper and means to drive said brush at a surface speed greater than that of said belt, said stripping means serving to strip meat and bones from the projections on said belt, a chute below said stripping means and the adjacent end of said belt for receiving meat and bones from said belt, said upper flight of the belt being longer than and substantially the same width as said platen and being disposed in vertical alignment with the platen, said means for adjusting the platen and said means for supporting the upper flight cooperating to hold the platen and the upper flight against separation, whereby the projections on the platen and the projections on the belt rub the meat from the bones as the same are moved by the belt between the platen and said upper flight.

11. Apparatus as defined in claim 10, in which said platen is mounted for longitudinal and transverse movement with respect to said belt, a plurality of recesses in the upper surface of said platen, a cam disposed in each recess, cam shafts fixed to said cams and disposed at right angles to the plane of said platen, common drive means for said cam shafts, whereby simultaneous operation of said cams will impart a gyratory motion to said platen in the horizontal plane thereof.

12. Apparatus as defined in claim 11, wherein the cams, the cam shafts, and the drive means for the cam shafts are mounted for movement with the platen during adjustment of the spacing between the platen and said upper flight.

References Cited in the file of this patent

UNITED STATES PATENTS

| | | |
|---|---|---|
| 22,894 | Rowe | Feb. 8, 1859 |
| 745,269 | Welch | Nov. 24, 1903 |
| 2,072,598 | Kile | Mar. 2, 1937 |
| 2,433,730 | Bridge | Dec. 30, 1947 |
| 2,605,797 | Green | Aug. 5, 1952 |
| 2,608,716 | Harris | Sept. 2, 1952 |
| 2,734,537 | Geisler | Feb. 14, 1956 |
| 2,798,251 | Lott | July 9, 1957 |
| 2,840,849 | Bergstrom et al. | July 1, 1958 |

FOREIGN PATENTS

| | | |
|---|---|---|
| 561,246 | Germany | Oct. 12, 1932 |
| 564,162 | Germany | Nov. 14, 1932 |